(12) United States Patent
Strathaus

(10) Patent No.: US 9,731,906 B2
(45) Date of Patent: Aug. 15, 2017

(54) CONVEYOR BELT SCRAPING DEVICE

(71) Applicant: F.E. Schulte Strathaus GmbH & CO. KG, Werl (DE)

(72) Inventor: Michael Schulte Strathaus, Wickede/Ruhr (DE)

(73) Assignee: F. E. Schulte Strathaus GmbH & CO. KG, Werl (DE)

( * ) Notice: Subject to any disclaimer, the term of this patent is extended or adjusted under 35 U.S.C. 154(b) by 0 days.

(21) Appl. No.: 15/327,240

(22) PCT Filed: Jun. 22, 2015

(86) PCT No.: PCT/EP2015/001251
§ 371 (c)(1),
(2) Date: Jan. 18, 2017

(87) PCT Pub. No.: WO2016/023604
PCT Pub. Date: Feb. 18, 2016

(65) Prior Publication Data
US 2017/0174441 A1    Jun. 22, 2017

(30) Foreign Application Priority Data

Aug. 11, 2014 (DE) .................... 20 2014 006 330 U
Sep. 5, 2014 (DE) .................... 20 2014 007 229 U

(51) Int. Cl.
B65G 45/16 (2006.01)
B65G 45/12 (2006.01)
(Continued)

(52) U.S. Cl.
CPC ............. *B65G 45/16* (2013.01); *B65G 45/12* (2013.01); *B65G 45/00* (2013.01); *B65G 45/14* (2013.01)

(58) Field of Classification Search
CPC ................................ B65G 45/16; B65G 45/12
(Continued)

(56) References Cited

U.S. PATENT DOCUMENTS 4,189,046 A  2/1980 Ward et al.
4,768,645 A  9/1988 Farris
(Continued)

FOREIGN PATENT DOCUMENTS

DE      19748070       5/1999
DE   602004005771      1/2008
(Continued)

OTHER PUBLICATIONS

ISR and Written Opinion, PCT/EP2015/001251, date of mailing Jun. 30, 2016.
(Continued)

*Primary Examiner* — James R Bidwell
(74) *Attorney, Agent, or Firm* — Andrus Intellectual Property Law, LLP

(57) ABSTRACT

A conveyor belt scraping device comprises a support shaft and at least one scraping segment arranged on the support shaft. The scraping segment has a holding end and a scraping end which is located opposite the holding end. The conveyor belt scraping device also comprises at least one holding support which is arranged on a stationary mounting and in which the support shaft is rotatably mounted, at least one drive element of a stationary drive motor, the drive element being coupled to the support shaft so as to transfer a torque, and a controller for the drive motor. The scraping end of the scraping segment can be made to contact the conveyor belt or can be released from the conveyor belt by way of a corresponding actuation of the drive motor and a movement of the drive element.

5 Claims, 7 Drawing Sheets

(51) Int. Cl.
*B65G 45/00* (2006.01)
*B65G 45/14* (2006.01)

(58) Field of Classification Search
USPC .................................. 198/497, 499
See application file for complete search history.

(56) References Cited

U.S. PATENT DOCUMENTS

| | | | |
|---|---|---|---|
| 4,825,997 A | 5/1989 | Bowman et al. | |
| 6,056,112 A | 5/2000 | Wiggins | |
| 6,374,991 B1* | 4/2002 | Swinderman .......... | B65G 45/12 198/499 |
| 8,205,741 B2* | 6/2012 | Swinderman .......... | B65G 43/02 198/499 |
| 2008/0053791 A1* | 3/2008 | Swinderman .......... | B65G 45/16 198/499 |

FOREIGN PATENT DOCUMENTS

| | | |
|---|---|---|
| DE | 202009004182 | 8/2010 |
| DE | 202012010945 | 2/2013 |
| DE | 202012010920 | 3/2013 |
| EP | 0566486 | 10/1993 |
| WO | 01/23284 | 4/2001 |
| WO | 2008/027732 | 3/2008 |

OTHER PUBLICATIONS

International Preliminary Report on Patentability, PCT/EP2015/001251, date of issuance Feb. 28, 2017.

* cited by examiner

CONVEYOR BELT SCRAPING DEVICE

CROSS-REFERENCE TO RELATED APPLICATIONS

This application is the U.S. national stage application of International Application PCT/EP2015/001251, filed Jun. 22, 2015, which international application was published on Feb. 18, 2016, as International Publication WO 2016/023604 in the English language. The International Application claims priority of German Patent Application No. 202014006330.3, filed Aug. 11, 2014 and German Patent Application No. 202014007229.9, filed Sep. 5, 2014. The international application and German applications are incorporated herein by reference, in entirety.

FIELD

The present disclosure relates to methods for operating a conveyor belt scraping device.

BACKGROUND AND SUMMARY

Conveyor belt systems use a moving conveyor belt for transporting sand, gravel, coal and other bulk materials from one location to another location. Sometimes a residue of the bulk material still sticks to the conveyor belt when the bulk material falls from the conveyor belt at the end at a deflection roller. A conveyor belt scraping device of the type discussed serves the purpose of scraping off the residual bulk material that clings to the conveyor belt.

A first conveyor belt scraping device is normally situated directly at the deflection roller of the conveyor belt as a so-called primary scraper. A secondary scraper is also situated in the majority of cases on the lower run of the conveyor belt behind the primary scraper in the running direction of the conveyor belt.

The scraping segments of a conveyor belt scraping device, which in the majority of cases are arranged in a plurality side by side, are fastened so as to be replaceable on a support shaft which, in the majority of cases, is rotatable and frequently also additionally linearly adjustable and extends transversely with respect to the conveyor belt.

A tensioning device is connected to one end of the support shaft or connected to both ends of the support shaft and comprises a lever structure or pretensioned springs in order to generate the necessary pretension. Occasionally a tensioning device also comprises a drive motor. The drive motor is then actuated by an electric or electronic control means.

When just one drive motor is discussed in the present case, this then includes a variant where several drive motors are provided, in particular one drive motor on each end of the support shaft.

When a drive motor is discussed in the present application, this then always means the drive motor as such including the output element of the drive motor, for example a rotating output shaft or a linearly extendable and retractable output element. Said output element is relatively movable in relation to the body of the drive motor and moves, in turn, a drive element for the scraping segment.

The drive motor is arranged in a stationary manner, for example on a stationary mounting, on which the support shaft is also rotatably mounted, or for example on a frame structure of the conveyor belt system overall.

The drive motor applies a rotatingly or linearly acting pretension force onto the support shaft which, in turn, moves the scraping segments to abut against the conveyor belt at a desired pretension with their scraping ends. The pretension has to be high enough in order to scrape off any bulk material residues clinging to the conveyor belt in a reliable manner, however it must not be so high that the conveyor belt is damaged.

During operation, proceeding from the scraping end, the scraping segment is subject to wear as it is situated in grinding engagement with the continuously moving conveyor belt.

In the case of a known conveyor belt scraping device (DE 60 2004 005 771 T2), the drive motor is controlled in a comprehensive manner. More precisely, two drive motors are present here, namely a first preferably pneumatic drive motor which only brings about the rotation of the support shaft, and a second electric drive motor which is realized as a linear motor and pivots the unit, produced from the first drive motor and the support shaft, about a stationary pivot axis in a circular-arc manner toward the conveyor belt or away from the conveyor belt. In the case of said design, only the second drive motor is arranged in a stationary manner. The state of the scraping segment is monitored by a wealth of sensors (torque sensor, load detection sensor, temperature sensor, wear sensor) and, by actuating the two series-connected drive motors, the scraping end of the scraping segment is pressed onto the conveyor belt always at the correct pressing force, that is to say pretensioned in relation to the conveyor belt.

The scraping segment can also be completely released from the conveyor belt and pivoted well away, for example in order to replace the worn scraping segment, as a result of actuating the drive motors, in particular the second electric drive motor which is realized as a linear drive.

Even when the singular is used when referring to the scraping segment, everything also applies to the plural. In particular, in practice it is normal to have several scraping segments mounted side by side in a row or offset with respect to one another on the support shaft over the width of a conveyor belt.

The previously explained, disclosed conveyor belt scraping device can hardly be improved with regard to the control of the pretension of the scraping segments. However, the expenditure involved here on drive technology, measurement technology and control technology is very high. The disclosed conveyor belt scraping device is therefore too expensive for many applications.

There is already known a conveyor belt scraping device which allows for reliable pretensioning of the scraping segments (EP 0 566 486 A1). Here a manual coupling is arranged between the drive element of the drive motor on the one side and the support shaft on the other side. This creates the necessary degree of freedom in order to adjust the relative rotational position of the support shaft and of the drive element manually with respect to one another. In the respectively manually adjusted position, the relative position of the support shaft and of the drive element of the drive motor can be fixed with the manual coupling.

The characteristic of this tensioning device consists in that the pretensioning of the scraping segment in relation to the conveyor belt can be performed manually with the drive motor in an end position. With every drive movement of the drive motor, for example out of a position in which the scraping segment is completely pivoted away (released) from the conveyor belt, the scraping segment can be placed against the conveyor belt again at the desired pretension as a result of approaching the end position of the drive motor. An adjustment of the pretension or a readjustment on account of wear on the scraping segments can be effected in the case of said design by releasing the manual coupling and manually adjusting the support shaft in relation to the drive element or the drive element in relation to the support shaft.

Finally, a manual coupling takes the place here of the first drive motor in the prior art mentioned above. As a result, the expenditure on drive technology, measurement technology and control technology for this conveyor belt scraping device is clearly less than before.

A manual coupling is operated by hand, but it can be effected with a tool, for example a screwdriver. Particularly preferred, however, is that the manual coupling is actuatable as such by hand without a tool.

The drive motor can be realized in any manner in this prior art. It is possible, in particular, to use a hydraulic drive motor or a pneumatic drive motor. It is also disclosed to use an electric drive motor.

All things are also possible, in principle, as regards the design of the drive motor. For example, it can be a drive motor where an output shaft is rotatingly moved. The rotational movement thereof can then be transmitted to the support shaft by means of a step-up gear unit or, preferably, a reduction gear unit.

A problem with above extensively explained construction of the prior art is that during operation of the conveyor belt scraping device the wear on the scraping segments leads to a decreasing pretension of the scraping segments at the conveyor belt.

Examples in the present disclosure improve the prior art method of operating a conveyor belt scraping device in that decreasing pretension in case of wear on the scraping segments can be compensated for.

Presumption for realizing the teaching of examples disclosed herein is the use of an electric drive motor. The design as a linear drive motor can be particularly preferred.

According to certain examples disclosed herein the force of the electric drive motor necessary for a desired pretension of the scraping end of the scraping segment against the conveyor belt is determined and regulated by means of the control means via the current drawn from the electric motor. A particular motor current is said as a boundary value for the desired pretension of the scraping end of the scraping segment. And then the electric drive motor is driven again and again at predetermined or determinable time intervals against the conveyor belt, in each case until the motor current said as a boundary value for the desired pretension is reached. Thus decreasing pretension following wear on the scraping segments can be comfortably compensated for.

Here, the advantages of manual adjustability are combined with the advantage of electric regulation of the drive motor.

Particularly preferred with regard to the manual adjustment is the adjusting of the relative rotational position as a result of manually rotating the support shaft with the position of the drive element unchanged. The support shaft can be rotated, for example, using a torque wrench until the desired pretension of the scraping segments is achieved. The manual coupling can then be engaged again such that said relative position of the drive element in relation to the support shaft is fixed.

Particularly advantageous, in this case, is that the manual coupling is connected to the support shaft in a non-rotatable manner and to the drive element in a manually adjustable and fixable manner. In addition, particularly advantageous is a design of the coupling in such a manner that the connection between the coupling and the drive element comprises a detent mechanism which is adjustable in steps and a stepless precision adjusting mechanism. Such a combination allows for rapid rough adjustment as a result of simply selecting a new notch, but also allows for a precision adjustment which is then subsequently effected in a stepless manner. The precision adjustment expediently takes place by way of corresponding adjusting screws.

There is naturally a wealth of possibilities for the arrangement of the drive element. The realization of the drive element as a gear wheel of a reduction gear unit has already been named above as an example. Structurally, it has proven particularly expedient for the drive element to be a lever which is mounted so as to be freely rotatable on the support shaft. In principle, the drive element can also be integrated in the output element of the drive motor.

The design with the freely rotatably mounted lever as the drive element obtains further importance in the overall arrangement where the mounting comprises a main carrier with a first end and a second end. The first end is the top end where the main carrier is in a vertical arrangement and the second end is the bottom end. The support shaft is expediently mounted in the main carrier by means of the holding bearing on the second end. The drive element, realized as a lever, protrudes laterally from the main carrier on the second end. An angular arrangement is consequently created which allows the drive motor to be mounted between the first end of the main carrier and the free end of the drive element. The entire arrangement is consequently in the form of a triangle. This is very expedient as the structure is able to be mounted quickly on the conveyor belt system by mounting the main carrier with the attachment parts.

The method according to the examples disclosed herein is more particularly easy to apply if the drive motor comprises two end positions, namely a first end position in the placing direction and a second end position in the releasing direction, wherein, for placing the scraping end of the scraping segment against the conveyor belt, the drive motor is moved into its first end position, and with the drive motor in the first end position, the scraping segment is placed with its scraping end against the conveyor belt at the desired pretension as a result of the application of force on the support shaft by utilizing the manual coupling and is fixed in the adjusted position by means of the manual coupling.

The afore-described design works without specific sensors.

BRIEF DESCRIPTION OF THE DRAWINGS

The concepts of the present disclosure are now explained in more detail below by way of a drawing which shows preferred exemplary embodiments and in which.

DETAILED DESCRIPTION OF THE DRAWINGS

Figure 1:
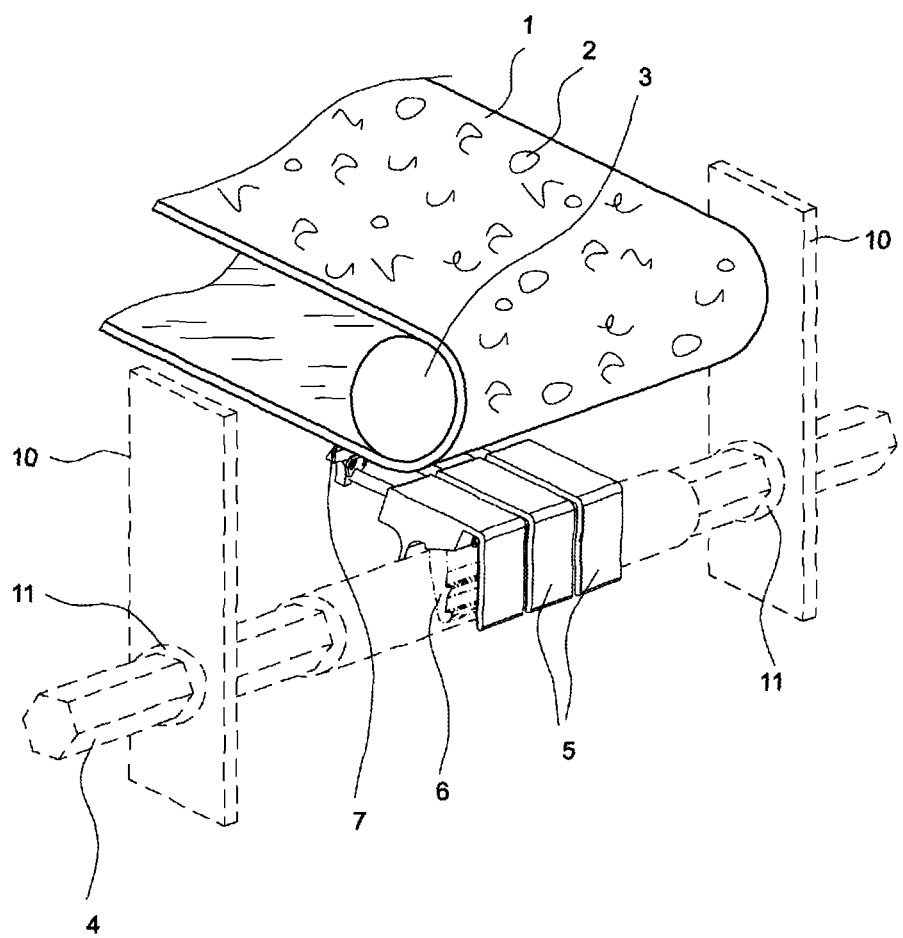
FIG. 1 shows a highly schematically simplified representation in perspective of the basic principle of a conveyor belt scraping device for a conveyor belt of a conveyor belt system.

FIG. 1 shows a schematic view of a conveyor belt 1 of a conveyor belt system on which bulk material 2 is situated. Said conveyor belt 1 runs from left to right in FIG. 1. It is deflected at a deflection roller 3 such that its bottom belt portion, the lower run, is able to run back to the starting point.

A support shaft 4 of the conveyor belt scraping device can be seen below the conveyor belt 1 and not far from the deflection roller 3. The support shaft 4 is hexagonal in cross section. Three scraping segments 5 are arranged as an example on the support shaft 4. Different mounting options here are described in the prior art. To this end, reference may be made to the prior art named in the introduction, but also to DE 20 2009 004 182 U1 and DE 20 2012 010 945 U1. The teaching of the invention does not include the manner of the mounting of the scraping segments 5 on the support shaft 4.

Figure 2:
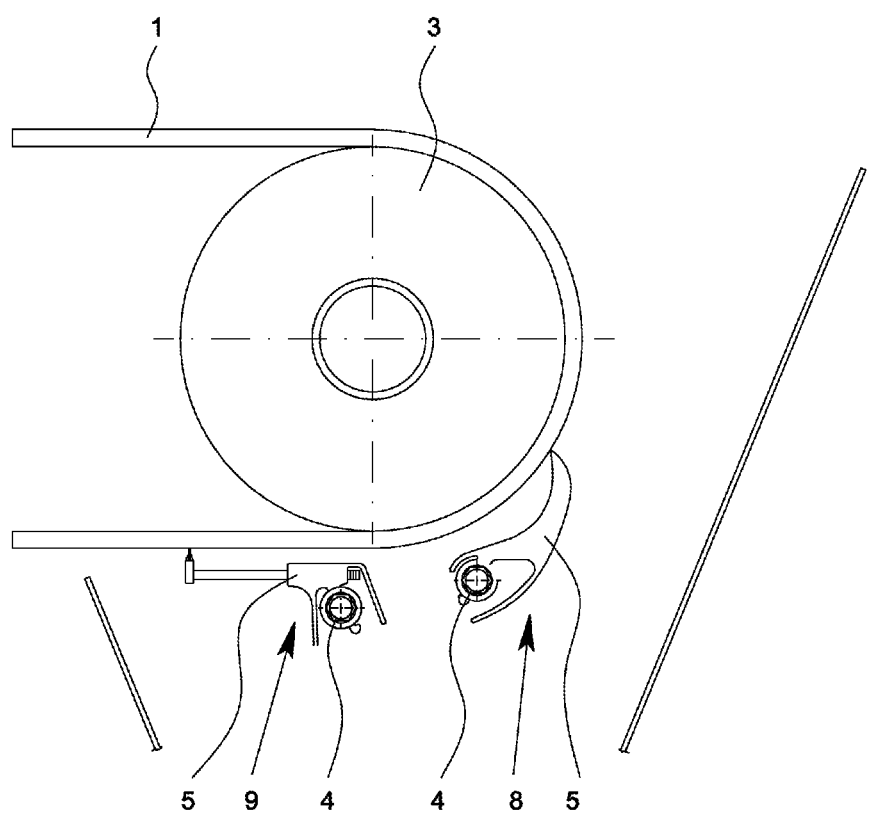
FIG. 2 shows a side view of the typical conveyor belt scraping devices on a conveyor belt.

It is important for the scraping segment 5 (singular also stands for plural here) to comprise a holding end 6, which is connected in a positively locking manner to the support shaft 4 so as to transmit torque, and a scraping end 7 which is situated opposite the holding end 6. FIG. 1, in this case, shows a secondary scraper where the scraping end 7 of the scraping segment 5 is placed on the conveyor belt 1 on the lower run somewhat behind the deflection roller 3. FIG. 2 shows a primary scraper 8 on the right and on the left a secondary scraper 9 as is shown in FIG. 1.

In addition, in FIG. 1 a stationary mounting 10 can be seen in each case on the left and on the right with in each case a holding bearing 11 which is arranged on the mounting 10 and in which, in the exemplary embodiment shown, the support shaft 4 is rotatably mounted.

FIG. 1 does not yet show any drive for the support shaft 4. FIG. 3 and FIGS. 4-9 have to be looked at in this respect.

Figure 3:
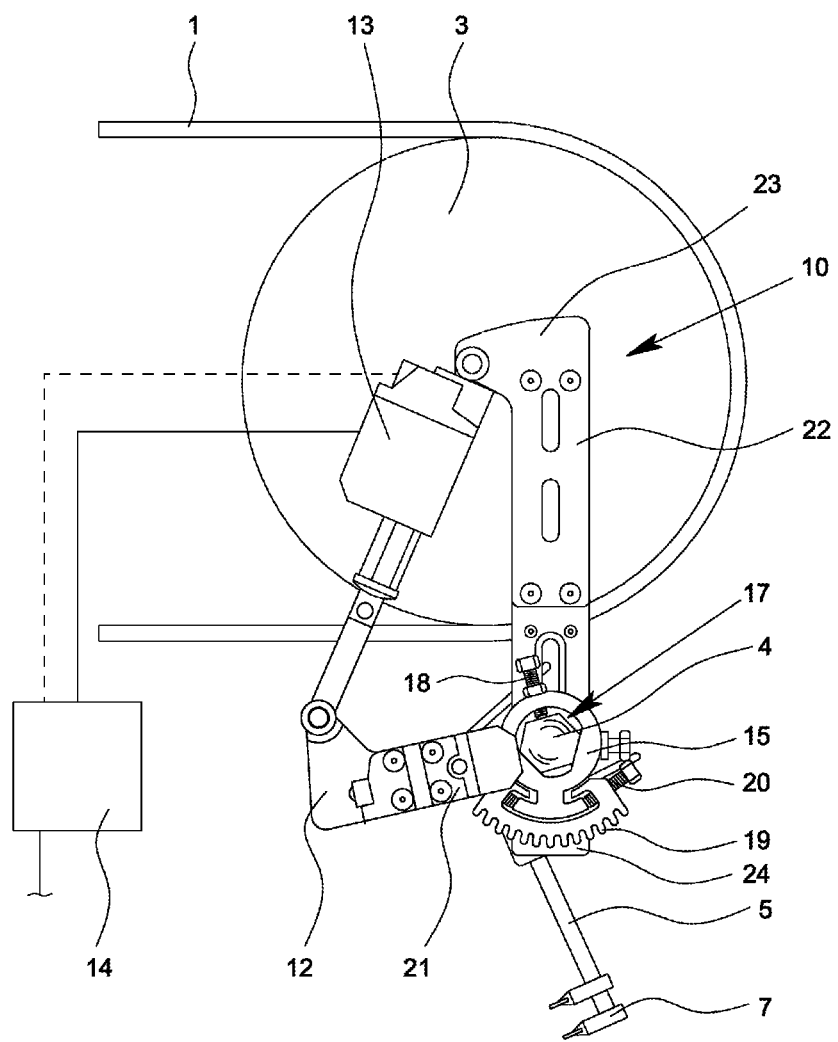
FIGS. 3-9 show different positions of a conveyor belt scraping device.

At least one drive element 12 of an electric drive motor 13, which is coupled to the support shaft 4, preferably at one end of the support shaft 4, so as to transmit torque, is provided. FIG. 3 also shows a schematic representation of a control means 14 for the electric drive motor 13. Such a control means is typically nowadays an electronic control means, in particular with corresponding control software.

As a result of correspondingly actuating the electric drive motor 13, the scraping segment 5 is placeable against the conveyor belt 1 with its scraping end 7 or is releasable from the conveyor belt 1, that is to say removable from the conveyor belt 1. The electric drive motor 13 itself is arranged in a stationary manner, for example on the stationary mounting 10 or for example on a frame structure of the conveyor belt system overall. The output element of the electric drive motor 13 is coupled in a suitable manner with the drive element 12.

The representation in FIGS. 3-9 shows once again the secondary scraper 9 which is indicated in FIGS. 1 and 2.

The electric drive motor 13 can have an arbitrary form, however it can be an electric linear drive motor 13. FIGS. 3-9 also refer to said example.

The output element of the linear drive motor 13 is extended in the representation in FIG. 3, the scraping segment 5 has been pivoted downward away as far as possible from the conveyor belt 1.

Figure 8:
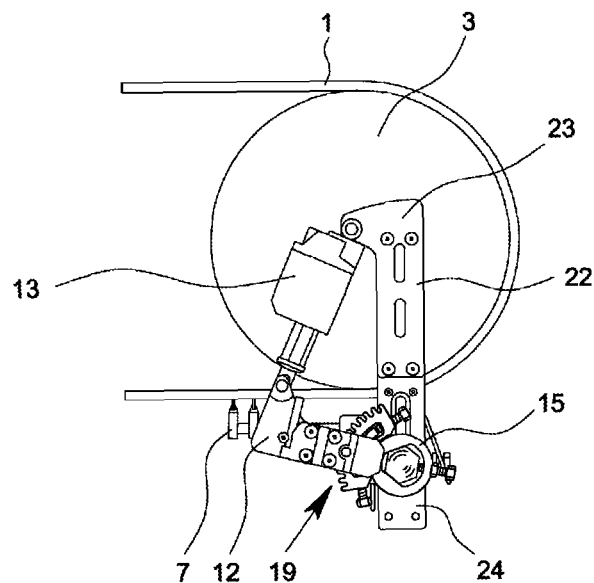

In FIG. 8, the output element of the linear drive motor 13 has been fully retracted and the scraping segment 5 is placed onto the conveyor belt 1 with its scraping end 7.

It is important to the invention then that a manual coupling 15 is arranged between the drive element 12 of the electric drive motor 13 on the one hand and the support shaft 4 on the other hand. The relative rotational position of the support shaft 4 and of the drive element 12 of the electric drive motor 13 relative to one another is manually adjustable by utilizing the coupling 15. The relative rotational position is then fixable in the respectively adjusted position by means of the coupling 15.

FIGS. 3-9 show the context depicted beforehand in individual examples.

In FIG. 3, as already mentioned, the scraping segment 5 with the scraping end 7 has been completely pivoted away from the conveyor belt 1. This is effected as a result of the output element of the electric drive motor 13, which here is an electric linear drive motor, being fully extended.

Figure 4:
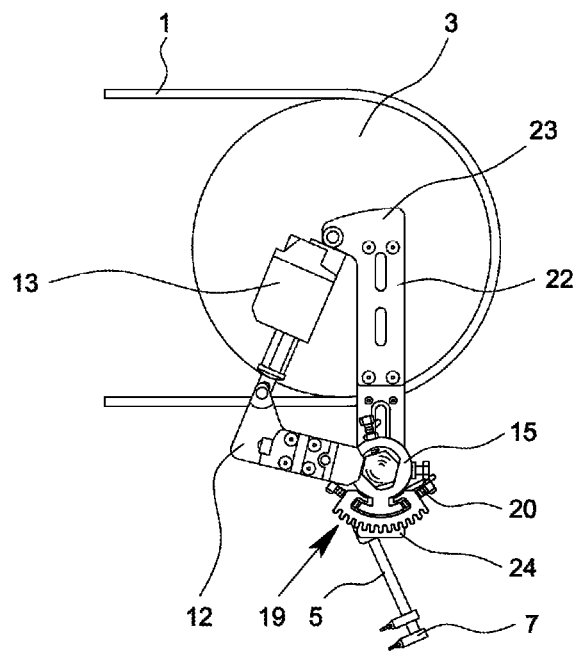

FIG. 4 shows the same position of the scraping segment 5 as in FIG. 3, however the output element of the electric drive motor 13 is fully retracted and the drive element 12 has been pivoted upward in relation to FIG. 3. This is possible because the manual coupling 15 has been disengaged.

Figure 5:
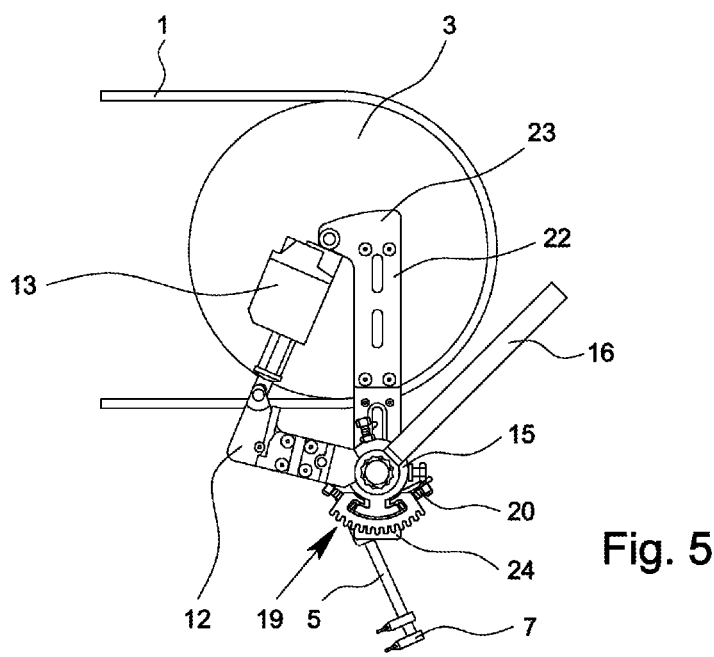

FIG. 5 shows the same position as FIG. 4. A wrench 16, in particular in the form of a torque wrench, has now been positioned on the support shaft 4.

Figure 6:
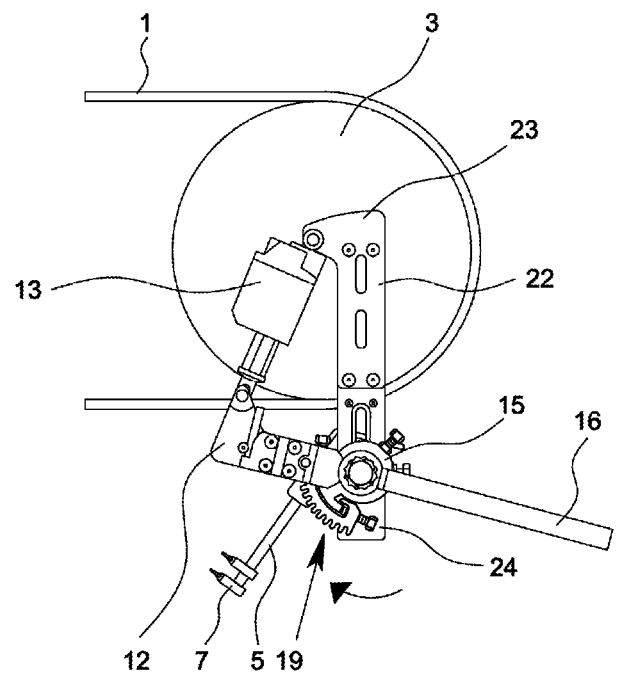

FIG. 6 differs from FIG. 5 in that, by means of the wrench 16, the support shaft 4, and with it the scraping segment 5, have been pivoted clockwise, indicated by the arrow in FIG. 6. The manual coupling 15 has been engaged in the outermost position. In said position, the output element of the electric drive motor 13 is still fully retracted.

Figure 7:
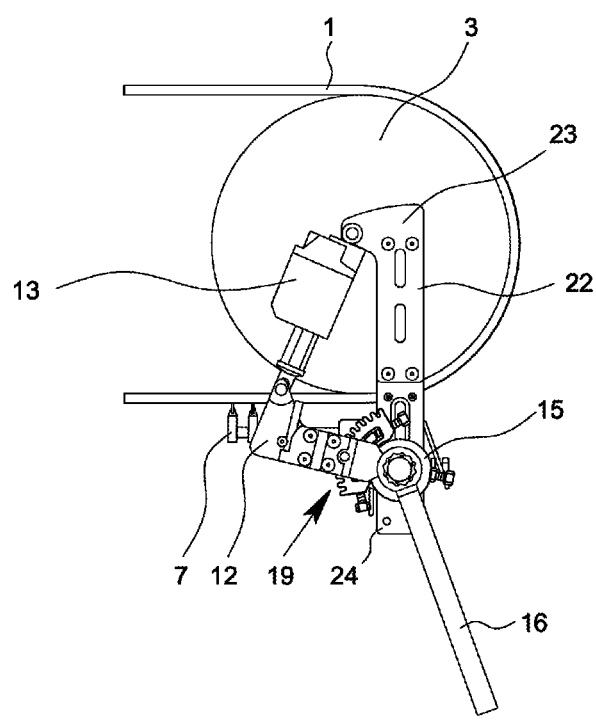

In FIG. 7 the output element of the drive motor 13 continues to be fully retracted. As a result of pivoting the wrench 16 further clockwise, the scraping segment 5 has also been pivoted further clockwise. The scraping end 7 of the scraping segment 5 is pretensioned in relation to the conveyor belt 1 at the desired pretension, which is adjusted as a result of the application of force onto the support shaft 4 by means of the wrench 16.

The support shaft 4 is held in the desired position, shown in FIG. 7, by means of the wrench 16. The manual coupling 15 is engaged. The wrench 16 is then removed. This is shown in FIG. 8. The desired end state of the pretension has now been achieved.

If, proceeding from the representation in FIG. 8, the output element of the electric drive motor 13 is now extended (as shown, for example, in FIG. 3), the scraping segment 5 is pivoted away from the conveyor belt 1 with the engaged manual coupling 15 unchanged. If the output element of the electric drive motor 13 is then retracted again, the scraping end 7 of the scraping segment 5, on account of the fixing of the relative position of support shaft 4 and drive element by means of the manual coupling 15, is placed against the conveyor belt 1 again at precisely the manually preset pretension. The electric drive motor 13 is in this case moved back into its end position.

Figure 9:
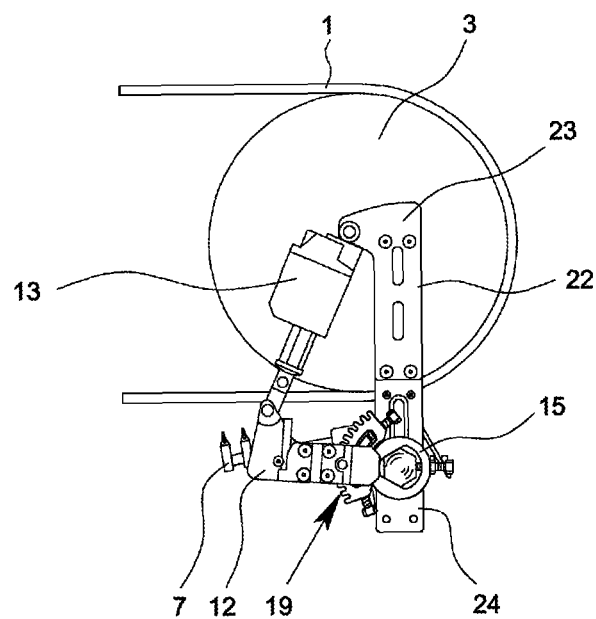

FIG. 9 shows a maintenance position for the scraping segment 5 where the output element of the electric drive motor 13 is extended a little. Nothing has changed in this case as regards the state of engagement of the manual coupling 15.

The representation, which was given beforehand, makes clear that in the exemplary embodiment shown here the adjusting of the relative rotational position by manually rotating the support shaft 4 is carried out with the position of the drive element 12 unchanged.

Figure 10:
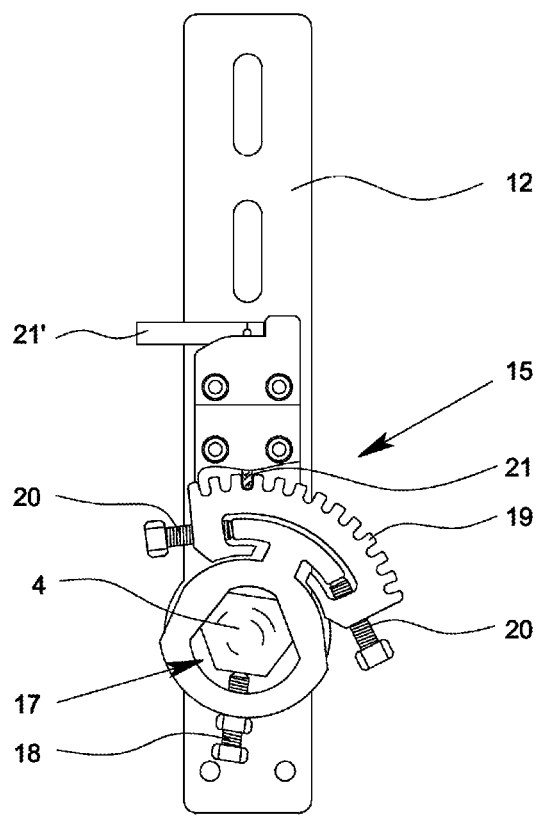
FIG. 10 shows an enlarged representation of a manual coupling as can be used regularly in the case of a conveyor belt scraping device.

FIG. 3 shows a complete representation of the drive. FIG. 10 shows an enlarged representation of only the manual coupling 15 on the support shaft 4 in connection with the drive element 12.

In the exemplary embodiment shown and in this respect preferred, it is provided that the manual coupling 15 is connected to the support shaft 4 in a non-rotatable manner and to the drive element 12 in a manually adjustable and fixable manner. For the non-rotatable connection between the manual coupling 15 and the support shaft 4, there is a polygonal recess 17 in the manual coupling 15 and a fixing screw 18 therein. The latter presses two faces of the support shaft 4 into the corresponding faces of the polygonal recess 17 and thus ensures a non-rotatable connection between the manual coupling 15 and the support shaft 4. The fixing screw 18, in this case, allows different sized support shafts 4 to be provided with one and the same manual coupling 15.

The manually adjustable and fixable connection between the manual coupling 15 and the drive element 12 is produced in the top region somewhat above the support shaft 4. To this end, according to the preferred teaching, it is provided here that the connection between the coupling 15 and the drive element 12 comprises a detent mechanism 19 which is adjustable in steps and a stepless precision adjusting mechanism 20. The part-circular sector gear of the detent mechanism 19 and, above the sector gear of the detent mechanism 19, a latching bolt 21 which engages from above in the detent mechanism 19 at the corresponding point and is secured on the drive element 12 can be seen. The representation in FIG. 10 shows the latching bolt 21 resting in the detent mechanism 19. The relative position of the manual coupling 15 in relation to the drive element 12 is fixed as a result.

The manual coupling 15 is actuatable here purely by hand, that is to say without any tooling. The grip 21' with which the latching bolt 21 in FIG. 10 can be pulled upward serves for this purpose.

If the latching bolt 21 in FIG. 10 is pulled upward with the grip 21', it moves out of engagement with the detent mechanism 19 and the drive element 12 can be pivoted to the right or the left in relation to the sector gear of the detent mechanism 19. If the grip 21' is then released again, the latching bolt 21 according to a preferred realization is pressed back into the detent mechanism 19 by means of spring force.

If the latching bolt 21, as shown in FIG. 10, rests in the detent mechanism 19, it is still possible to perform the precision adjusting 20 by means of the two adjusting screws which are to the left and to the right. If, in FIG. 10, it is desired to pivot the drive element 12 to the left in relation to the support shaft 4, the left-hand adjusting screw of the precision adjusting mechanism 20 is screwed in and the right-hand screw is screwed out. The procedure is reversed if pivoting to the right is desired.

FIG. 3 (and FIGS. 4-9) show for the entire arrangement of the mounting 10 a design where it is provided that the mounting 10 comprises at least one main carrier 22 with a first, preferably top end 23 and a second, preferably bottom end 24. The support shaft 4 is mounted in the holding bearing 11 on the second end 24. The drive element 12, which is realized as a lever, protrudes laterally from the main carrier 22 on the second end 24 and the drive motor 13 is mounted between the first end 23 of the main carrier 22 and the free end of the drive element 12. In this way, the entire arrangement is in the form of a triangle. It can be handled overall in an easy manner by the main carrier of the mounting 10 being mounted fixedly at the desired position on the conveyor belt system.

The drive element 12 can be designed in various ways as regards the manual coupling 15 with the drive element shown in FIG. 3 and FIG. 10. It does not necessarily have to be in the form of a strip. It can comprise different lengths, widths and thicknesses, all in dependence on the structural design of the specific conveyor belt scraping device.

Different ways of realizing the manual coupling 15 overall are also possible and will be chosen by a person skilled in the art in a suitable manner depending on the application and the circumstances.

The representation in FIGS. 3-9, which has been explained in detail beforehand, allows for the following inventive method of operation of the conveyor belt scraping device according to the invention.

With its output element, the electric drive motor 13 comprises two end positions, namely a first end position in the placing direction and a second end position in the releasing direction. The electric drive motor 13 is moved into its first end position for placing the scraping end 7 of the scraping segment 5 against the conveyor belt 1. With the electric drive motor 13 in the first end position, the scraping segment 5 is placed with its scraping end 7 against the conveyor belt 1 at the desired pretension as a result of the application of force on the support shaft 4 by utilizing the manual coupling 15. The support shaft 4 is then fixed in the adjusted position with the scraping segment 5 by means of the manual coupling 15. This has the advantage already mentioned above that, even with the electric drive motor 13 fully retracted, the pretension of the scraping end 7 of the scraping segment 5 on the conveyor belt 1 will not rise higher than as manually adjusted by utilizing the coupling 15. The application of force of the electric drive motor 13 necessary for the desired pretension of the scraping end 7 of the scraping segment 5 is determined and regulated by means of the control means 14 via the current drawn from the electric drive motor 13. This is indicated in FIG. 3 with the control means 14 shown there by the dotted line from the electric drive motor 13 to the control means 14.

The invention claimed is:

1. A method for operating a conveyor belt scraping device for a conveyor belt of a conveyor belt system, wherein the conveyor belt scraping device comprises:
   a support shaft and at least one scraping segment arranged on the support shaft wherein the scraping segment comprises a holding end which is connected to the support shaft in a positive locking manner so as to transmit torque, and a scraping end which is situated opposite the holding end,
   at least one holding bearing which is arranged on a stationary mounting in which the support shaft is rotatably mounted,
   at least one drive element of an immovably arranged electric drive motor which is coupled to the support shaft so as to transmit torque,
   a control means for the electric drive motor, wherein as a result of correspondingly actuating the electric drive motor and moving the drive element the scraping segment is moved with its scraping end against the conveyor belt or is removed from the conveyor belt,
   the method comprising:
   determining a force of the electric drive motor necessary for a desired pretension of the scraping end of the scraping segment against the conveyor belt and regulating the force with the control means via a current drawn from the electric drive motor,
   setting a particular motor current as a boundary value for the desired pretension of the scraping end of the scraping segment, and
   driving the electric drive motor again and again at predetermined or determinable time intervals against the conveyor belt, in each case until the particular motor current set as a boundary value for the desired pretension is reached.

2. The method according to claim 1, wherein a manual coupling is arranged between the drive element of the electric drive motor and the support shaft and further comprising utilizing the manual coupling to manually adjust and fix the relative rotational position of the support shaft and of the drive element with respect to one another and in the respectively adjusted position.

3. The method according to claim 1, further comprising adjusting the relative rotational position by manually rotating the support shaft with the position of the drive element unchanged.

4. The method according to claim 3, wherein the electric drive motor has two end positions, namely a first end position in the placing direction and a second end position in the releasing direction, wherein before motorized driving the scraping end of the scraping segment against the conveyor belt the electric drive motor is moved into its first end position, and, wherein with the electric drive motor in its first end position, the scraping segment is placeable with its scraping end against the conveyor belt at the desired pretension as a result of the application of force on the support shaft by utilizing the manual coupling and is fixed in the adjusted position with the manual coupling.

5. The method according to claim 2, wherein the electric drive motor has two end positions, namely a first end position in the placing direction and a second end position in the releasing direction, wherein before motorized driving the scraping end of the scraping segment against the conveyor belt the electric drive motor is moved into its first end position, and, wherein with the electric drive motor in its first end position, the scraping segment is placeable with its scraping end against the conveyor belt at the desired pretension as a result of the application of force on the support shaft by utilizing the manual coupling and is fixed in the adjusted position with the manual coupling.

* * * * *